United States Patent [19]
Rivelli et al.

[11] 3,904,852
[45] Sept. 9, 1975

[54] DEEP FAT FRYING COOKING CONTROL MODULE

[75] Inventors: Louis E. Rivelli, Shelton; Miles J. Barnes, Woodbridge, both of Conn.

[73] Assignee: Food Automation-Service Techniques, Inc., Stratford, Conn.

[22] Filed: Feb. 3, 1975

[21] Appl. No.: 546,501

[52] U.S. Cl. .................... 219/442; 99/333; 99/403; 219/435; 219/494
[51] Int. Cl.² ........................................ F27D 11/02
[58] Field of Search .......... 219/412, 413, 425, 435, 219/436, 437, 438, 441, 442, 494; 99/331, 332, 333, 403

[56] References Cited
UNITED STATES PATENTS

| | | |
|---|---|---|
| 2,805,314 | 9/1957 | Michaelis .......................... 219/437 |
| 3,720,155 | 3/1973 | Fritzsche ............................. 99/337 |
| 3,787,594 | 1/1974 | Palmason .......................... 99/403 X |
| 3,824,373 | 7/1974 | Napier ............................... 219/494 |
| 3,828,163 | 8/1974 | Amagami et al. ................... 219/413 |

Primary Examiner—Volodymyr Y. Mayewsky
Attorney, Agent, or Firm—Haynes N. Johnson

[57] ABSTRACT

A deep fat frying cooking system includes a solid state deep fat frying cooking timing control computer directly within the cooker console. The heat sensitive computer circuitry is positioned within a dead air compartment located behind the front panel of the cooker console aiding convenience of operation. The timing control computer is provided as a modular unit which may be easily mounted in the panel and conveniently removed for necessary replacement and/or repair.

4 Claims, 4 Drawing Figures

DEEP FAT FRYING COOKING CONTROL MODULE

BACKGROUND OF THE INVENTION

This invention relates to deep fat frying cooking systems and more particularly to such systems utilizing programmed control of the cooking process to achieve reproducible predetermined cooked product characteristics.

Deep fat frying cooking is widely used in restaurants and similar commercial food establishments and has found increasing popularity in fast food operations where it is utilized for the preparation of food products such as french fries, onion rings, fish sticks and the like. Perhaps the most significant criteria to be met in preparing such foods, aside from taste, is the degree of "doneness" which in the case of deep fat fried food can be recognized as crispness of product. The degree of "doneness" or crispness that is desired by the consuming public frequently varies from one geographical location to another. However, within one location, particularly within a single food outlet, it is desirable to maintain a consistent average standard of degree of "doneness" or crispness and thus quality control becomes essential.

Deep fat frying cooking is a function of heat transfer in that a given amount of heat transfer will produce a known change in the food product. Thus, it is possible to measure "doneness" or crispness by measuring the amount of heat transferred to the product. Ideally, given the same amount of food product in the same condition and the same amount of heat transfer during each cooking cycle, cooking could be regulated according to a fixed time. In actuality, however, these conditions do not exist since the product varies from unit to unit to a degree and, therefore, the proper cooking time varies also. Generally, the individual responsible for cooking determines the degree of "doneness" or crispness of a product, such as french fries, by tasting, feeling and observing the appearance of the product. This is somewhat subjective and disadvantageous, especially within a fast food outlet where the personnel vary from employment shift to shift or if there is a turnover of personnel.

To overcome the aforementioned disadvantages, a deep fat frying cooking control to achieve product consistency has been provided. Such a device, available under the trademark (FASTRON), is a solid state cooking computer for fried food products such as french fries and the like manufactured by Food Automation Service Techniques Incorporated. Such a cooking computer provides crisp control by computing the proper cooking cycle for french fries regardless of such variables as cooking oil temperature, potato temperature, potato solids content, potato size or cut, inconsistent blanching, batch size and employee experience. The solid state cooking computer is factory programmed to cook the potato to the desired average degree of "doneness" or crispness by timing the cooking cycle.

The solid state cooking computer has generally been located in a control unit mounted near the deep fat fryer cooker. A probe, set in the base of the fryer kettle or well connects the control components contained in a sealed cabinet to the fryer kettle. The solid state timing controls themselves are maintained separated from the deep fat fryer cooking console because of the high heat generated by the cooking kettles and transferred to the surrounding air and housing enclosing them. If the solid state components are subjected to temperatures much above 158°F a danger exists that the solid state controls would be adversely affected. Thus, the timing controls have always been provided in a separate unit apart from the cooker console housing to avoid the deleterious effects of the high temperatures involved although the simple controls for the cooker, such as on-off and temperature variation controls, have been mounted within the cooker console itself since these are not temperature sensitive. It would be beneficial to convenience of use and packaging of equipment and related controls to be able to provide such solid state timing controls for regulating the degree of product "doneness" or crispness directly within the cooker console itself.

SUMMARY OF THE INVENTION

The present invention overcomes the drawbacks associated with the need for providing the solid state cooking computer controls in a unit separate from the deep fat fryer cooker console itself, facilitates operation of the computer activation controls by the chef and provides economy of manufacture in making available a more efficient cooker console which directly incorporates the timing controls. The foregoing is achieved, according to the invention, by providing a dead air space compartment, within the cooker console housing, in which the temperature is maintained below that temperature which would be deleterious to the solid state timing components.

Thus, while the cooker console housing interior heats up, and convection flow of air therein and to the outside is permitted for cooling, the dead air space compartment contains no convection flow of air and is sealed from the housing interior avoiding the temperatures therein. The compartment is advantageously provided on the front panel of the cooker console which contains the other frying kettle controls which are not temperature sensitive. The computer controls can be placed directly within the panel as a modular unit with the probe passing directly to any wall of the cooking kettle for measuring the necessary oil characteristics. Since the cooking computer is located within the front panel adjacent to the other controls it is convenient to operate, and, being a module located in the front of the console, may be readily removed for replacement and/or repair if necessary.

Thus, it is a feature of this invention to provide cooking timing controls directly within the console housing the deep fat fryer cooker. It is a further feature of this invention to provide a means within the console housing deep fat fryer cookers wherein temperature sensitive electric and electronic elements may be mounted free from the deleterious effect of high temperaturs normally present within the console housing. Another feature of this invention is the provision of a modular deep fat fryer cooking control unit for mounting in the cooker console.

BRIEF DESCRIPTION OF THE DRAWINGS

The aforementioned advantages and features of this invention will become more apparent from the following description of the invention taken in conjunction with the accompanying drawings in which.

DETAILED DESCRIPTION OF THE PREFERRED EMBODIMENT

Figure 1:
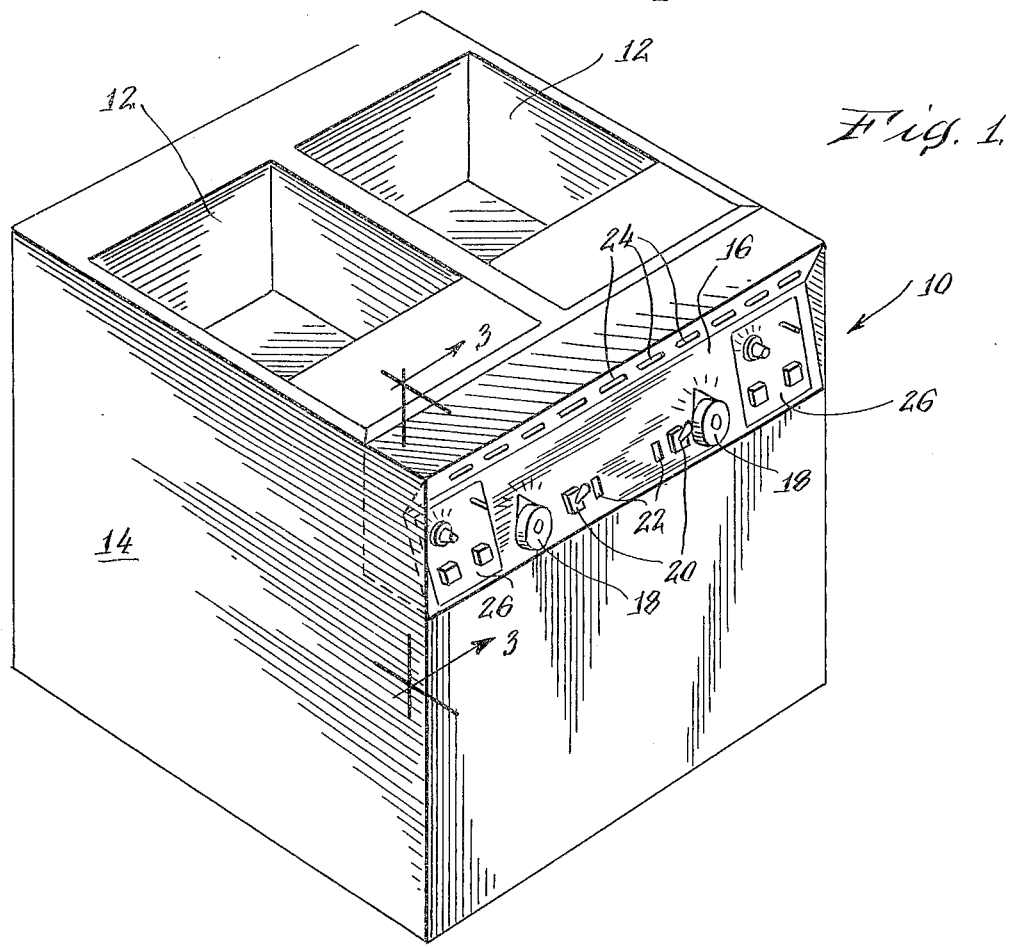
FIG. 1 is a top front perspective view of a deep fat frying cooker console showing the cooking timing control module positioned in the front panel thereof in accordance with an embodiment of the invention.

FIG. 1 illustrates a typical deep fat fryer cooking system having a cooker console 10 such as may be obtained commercially under the tradename FRYMASTER. The cooker console 10 includes deep fat frying kettles or wells 12 surrounded by an enclosure housing 14. Associated with the cooker console may be racks for supporting the frying baskets out of the cooking oil and similar known appurtenances which are not relevant to the present invention and need not be shown. The cooker console 10 has a panel, indicated generally at 16, mounted within the front of the housing 14 and spaced a distance from the front walls of the frying kettles 12.

The panel 16 carries kettle temperature variation controls 18 for regulating the temperature of the cooking oil within the kettle, on-off switches 20 and indicator lights 22. The panel 16 may also carry protective circuitry for the deep fat fryer cooker which functions as a safety switch to shut down the unit if the oil or shortening temperature reaches a dangerously high temperature, around 400°F. The panel 16 also contains slotted openings 24 along its upper edge which serve to release warm air within the housing which has been heated due to the high operating temperatures of the kettles 12.

Figure 2:
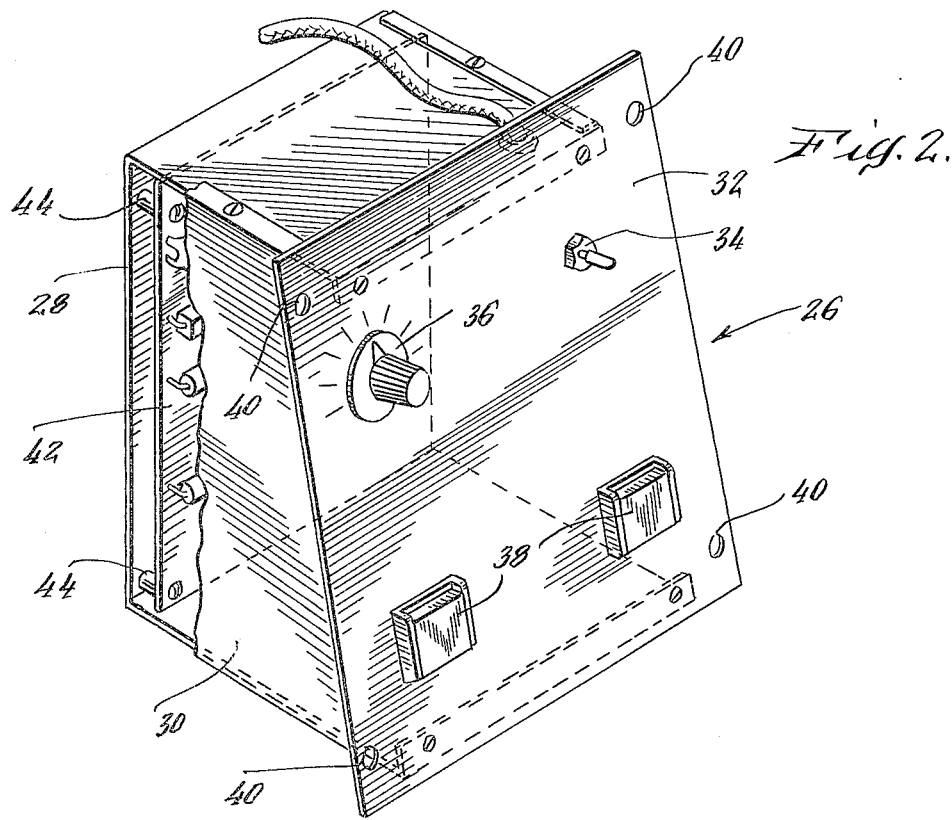
FIG. 2 is a top front perspective view of a cooking timing control module according to an embodiment of this invention.

Mounted within the panel 16 are solid state cooking timing controls or computer modules 26, shown in greater detail in FIG. 2. Referring to FIG. 2, it is seen that the computer module 26 comprises a chassis 28 to which are attached side covers 30 and a front panel face plate 32. The front panel 32 carries a test switch 34 which may be left in "operate" position or positioned to test the control probe or the solid state controls. An adjustable dial control 36 enables the user to select the degree of crispness control for reproducible crispness of the food fried in the kettle 12. The cook cycle starting and stopping switches are shown at 38. The front panel face plate 32 contains openings 40 utilized to fasten the computer module 26 in the panel 16 of the cooker console 10.

Figure 3:
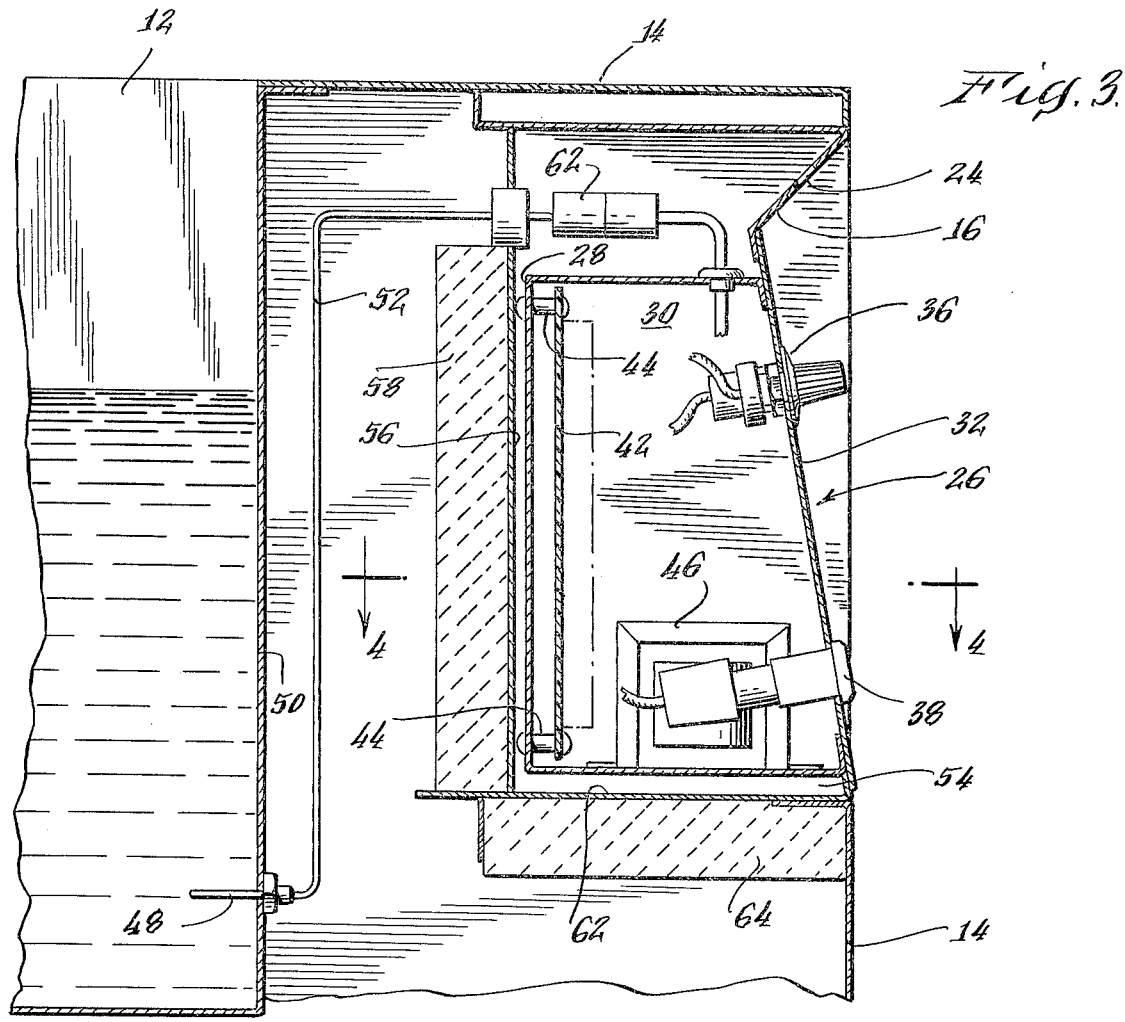
FIG. 3 is a side view, partly in section, of the tming control module, showing its position within the cooker console, taken along line 3—3 of FIG. 1.

The interior of the computer module 26 includes those components which form the circuit for cooking timing control. Referring to FIG. 3, it can be seen that printed circuit board 42 is spaced from the chassis 28 by means of spacing bolts 44. This aids in reducing conducted heat flow to the board from the module and provides a space for cooling air flow if desired. The specific details of the electrical circuitry components need not be described for the purposes of this invention, it being sufficient to point out that they are all contained within the computer module 26 for convenient insertion into the panel 16. A separable connection, such as the coupling 62, permits quick connection and disconnection of the module circuitry to the control probe. Thus, the computer module includes the electrical and electronic components on the printed circuit board 42, the switches such as 36 and 38 and various other components, such as transformer 46, mounted therein. A probe 48, positioned in any side 50 of the cooking kettle 12, senses the characteristics of the oil in the kettle and transmits a signal representative of the same to the computer module 26 via the line represented at 52.

Figure 4:
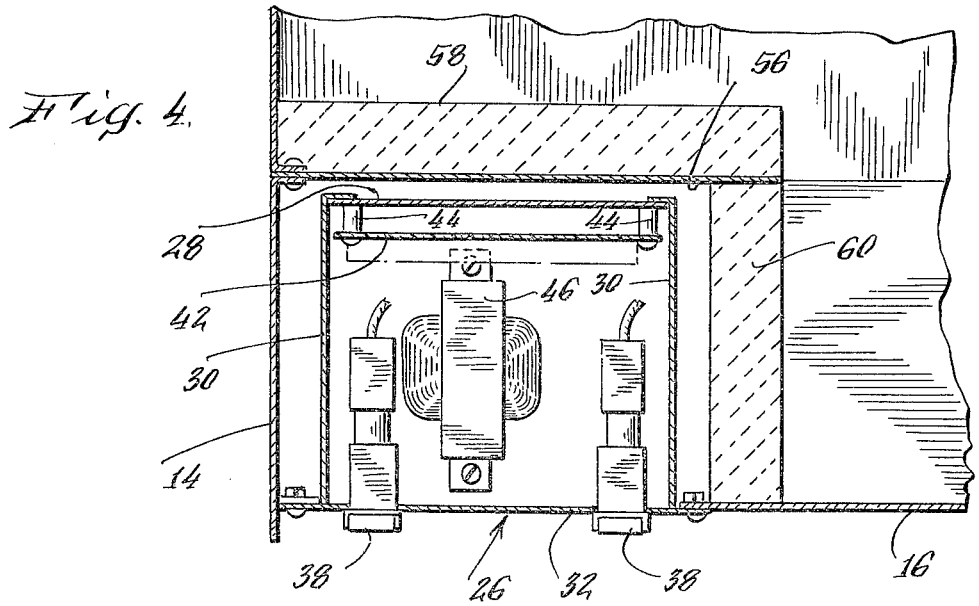
FIG. 4 is a top view, in section, of the timing control module, taken along the line 4—4 of FIG. 3.

FIGS. 3 and 4 show the manner in which the computer module 26 is mounted within a compartment 54 situated between the panel 16 and the front side 50 of the frying kettle 12. The compartment 54 is mounted on the side nearest the front side of the cooking kettle and separated therefrom by means of a rear wall 56 having insulation means 58 thereon. The two side walls of the compartment 54 are defined by the outer wall of the housing 14 and an opposite compartment wall defined by insulation means 60 which is firmly affixed to the panel 16 and the rear wall 56. A compartment floor or bottom wall 62 also carries insulation means 64 which cooperates with the other insulation means described to provide thermal shielding for the compartment from the hot air within the housing 14.

The compartment 54 is thus closed off from the interior chamber of the cooker console 10 defined by the housing 14 and communicates with the exterior of the console only through the slotted openings 24. Thus, the compartment 54 defines a dead air space through which no air is circulating. In contrast, however, air circulates within the interior of the housing 14 due to convection currents arising from the heat of the frying kettles 12. This air circulates and exits from the cooling slots 24 in the panel 16. The temperature of this circulating air may be as high as 250°F in the region of the panel 16. Such a temperature would be harmful to solid state components, such as those in the timing control circuit, which are highly temperature sensitive.

However, according to this invention, insulation is provided which retards heat transfer from the air flow in the region immediately adjacent to the compartment 54, containing the computer module 26. Consequently, the air in the compartment is kept cooler, below about 158°F. In addition, the computer module 26 is mounted within the dead air space in the compartment 54 and is spaced from the sides of the compartment, at least approximately one quarter of an inch, to avoid any heat conduction flow due to contact between the module 26 and the walls of the housing 14. The only contact is between the front panel face plate 32 of the module 26 and the panel 16 of the cooker console 10. Although this front panel 16 may be warm, it is much cooler than the convection air within the housing 14, being designed to be at least under 160°F, since such is the temperature considered the maximum that a human can touch momentarily without being burned. Thus, dead air surrounds the five sides of the computer module unit 26 while the front panel is exposed to the ambient room air.

Heretofore, it was not believed that solid state components of such a computer could be located directly within the cooker console 10. The components used in such circuitry generally have an operational rating of approximately 158°F. The problems of temperature sensitivity overcome by this invention also make possible the insertion of the probe 48, for the control of the cooking time, directly through the front wall 50 of the kettle 12. Thus, the computer module 26 itself is most conveniently mounted on the panel 16 within the housing 14 of the cooker console 10 in close proximity thereto.

The computer solid state components themselves generate little heat. Nevertheless, if desired, the side covers 30 can be provided with openings so that the interior of the module 26 can communicate with the compartment 54. The location of the computer module 26 on the front panel 16 facilitates its convenience for operation. The chef need merely push the cook cycle start switch 38 each time one or more baskets of food to be fried are set in the frying kettle 12. When done according to the previously selected degree of doneness selected by control 36, a buzzer, which is part of the computer circuitry, sounds and/or another signal, such as a light, is provided. The food is then removed and the cycle switch once again pushed to quiet the buzzer and/or extinguish the light.

By providing the cooking timing control computer in a module such as 26, it can be readily installed in the panel 16 and can be easily removed for repair or replacement. This also reduces the risk of having to run wires externally to connect the probe to a computer unit located at a position distant from the cooker console 10 and the frying kettle 12 and thus increases safety.

We claim:

1. In a deep fat fryer cooking system including a deep fat frying kettle and heating means for heating the same, a housing substantially enclosing the bottom and four sides of the kettle and having a panel in proximity to a side of the kettle, the panel carrying kettle on-off and temperature controls and the like, the improvement of a heat sensitive solid state electrical circuitry deep fat frying cooking timing control computer module located in the panel, comprising:

a chamber defined essentially by the frying kettle, the panel and the housing, the chamber being adapted to provide convection air flow for cooling of the frying kettle, a thermally insulated compartment within the chamber, the compartment being sealed from communiation with the chamber so as to define a dead air space therein, the temperature of the air within the chamber being above that temperature having a deleterious effect on the solid state electrical components of the computer, the temperature of the air within the compartment being below that temperature having a deleterious effect on the solid state electrical components of the computer, and the computer module being positioned within the compartment.

2. The improvement as claimed in claim 1 wherein:

one wall of the compartment is formed by the panel, the other walls defining the compartment are positioned within the chamber, and the computer module is mounted in the panel and the compartment maintained spaced from the walls of the compartment positioned within the chamber so as to minimize the likelihood of conduction heat flow to the module from the chamber.

3. The improvement as claimed in claim 2 wherein:

a sensing probe means for sensing the characteristics of the frying oil is connected to the computer module, and the probe means is inserted in the wall of the frying kettle most proximate to the compartment containing the computer module.

4. The improvement as claimed in claim 2 wherein:

the heat sensitive solid state components of the computer are located on a board-like support means, and the support means is positioned within the computer module spaced from the walls of the module.

* * * * *